United States Patent
Mukerji et al.

(10) Patent No.: US 8,041,643 B2
(45) Date of Patent: Oct. 18, 2011

(54) SYSTEM AND METHOD OF PROVIDING MEDIA CONTENT

(75) Inventors: Ankur Mukerji, Austin, TX (US); Charles Scott, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 632 days.

(21) Appl. No.: 11/716,529

(22) Filed: Mar. 9, 2007

(65) Prior Publication Data

US 2008/0222045 A1 Sep. 11, 2008

(51) Int. Cl.
- G06F 17/06 (2006.01)
- H04K 1/00 (2006.01)
- G09C 00/00 (2006.01)
- H04N 7/16 (2006.01)

(52) U.S. Cl. ............... 705/59; 705/51; 705/52; 705/54; 705/57

(58) Field of Classification Search .................. 705/1–79
See application file for complete search history.

(56) References Cited

U.S. PATENT DOCUMENTS

| | | | |
|---|---|---|---|
| 4,789,863 A | 12/1988 | Bush | |
| 5,003,384 A | 3/1991 | Durden et al. | |
| 5,367,330 A | 11/1994 | Haave et al. | |
| 5,459,506 A | 10/1995 | Bushnell | |
| 5,945,987 A * | 8/1999 | Dunn | 715/718 |
| 6,025,868 A | 2/2000 | Russo | |
| 6,243,465 B1 | 6/2001 | Ullrich et al. | |
| 6,256,393 B1 * | 7/2001 | Safadi et al. | 380/232 |
| 6,526,577 B1 | 2/2003 | Knudson et al. | |
| 6,732,366 B1 | 5/2004 | Russo | |
| 6,745,245 B1 * | 6/2004 | Carpenter | 709/229 |
| 7,134,131 B1 | 11/2006 | Hendricks et al. | |
| 7,149,593 B2 | 12/2006 | Wiser et al. | |
| 7,444,413 B2 * | 10/2008 | Saxena | 709/229 |
| 2001/0029583 A1 * | 10/2001 | Palatov et al. | 713/193 |
| 2002/0146234 A1 | 10/2002 | Mizuno | |
| 2003/0051249 A1 * | 3/2003 | Hoang | 725/95 |
| 2004/0111754 A1 * | 6/2004 | Bushey et al. | 725/115 |
| 2004/0117841 A1 | 6/2004 | Urakoshi | |
| 2004/0220926 A1 | 11/2004 | Lamkin et al. | |
| 2004/0244031 A1 * | 12/2004 | Martinez | 725/25 |
| 2005/0049933 A1 * | 3/2005 | Upendran et al. | 705/26 |
| 2005/0066353 A1 * | 3/2005 | Fransdonk | 725/29 |
| 2005/0138654 A1 * | 6/2005 | Minne | 725/31 |
| 2005/0160465 A1 * | 7/2005 | Walker | 725/86 |

(Continued)

OTHER PUBLICATIONS

Markus Jakobsson, Jean-Pierre Hubaux, and Levente Buttyan, "A Micro-Payment Scheme Encouraging Colloaboration in Multi-Hop Cellular Networks," 2003, 19 pages.

(Continued)

*Primary Examiner* — Andrew J. Fischer
*Assistant Examiner* — Murali K Dega
(74) *Attorney, Agent, or Firm* — Toler Law Group (57) ABSTRACT

A method of providing media content access is disclosed that includes providing a list of available media content to a display device and receiving a selection related to the list of available media content. The method further includes sending data related to the selection to a content source and to an access rule source and receiving media content from the content source based on the selection and an access rule related to the media content from the access rule source. The method also includes applying the access rule to the selected media content, where the access rule defines a restriction to limit access to the media content.

24 Claims, 8 Drawing Sheets

U.S. PATENT DOCUMENTS

| | | | |
|---|---|---|---|
| 2005/0198677 A1* | 9/2005 | Lewis | 725/87 |
| 2006/0047957 A1* | 3/2006 | Helms et al. | 713/165 |
| 2006/0156352 A1* | 7/2006 | Smith et al. | 725/86 |
| 2006/0212908 A1 | 9/2006 | Hunter et al. | |
| 2006/0229904 A1 | 10/2006 | Hunter et al. | |
| 2006/0288398 A1* | 12/2006 | Huslak et al. | 725/136 |
| 2007/0157251 A1* | 7/2007 | Shrivastava et al. | 725/60 |
| 2007/0186266 A1* | 8/2007 | Watson et al. | 725/134 |
| 2007/0294170 A1* | 12/2007 | Vantalon et al. | 705/50 |
| 2008/0155613 A1* | 6/2008 | Benya et al. | 725/89 |

OTHER PUBLICATIONS

Silvio Micali and Ronald I. Rivest, "Micropayments Revisited," 2002, 16 pages.

\* cited by examiner

SYSTEM AND METHOD OF PROVIDING MEDIA CONTENT

FIELD OF THE DISCLOSURE

The present disclosure is generally related to systems and methods of providing media content.

BACKGROUND

Viewing media content, such as television programs, is a part of daily life for many people. Advances in technology allow service providers to offer a wide range of media content, including television programming, video on demand services, network digital video recording services, and other services. Such advances in technology may also allow users to share media content with other users via their respective set-top box devices. Hence, there is a need for systems and methods to provide media content.

DETAILED DESCRIPTION OF THE DRAWINGS

In a particular embodiment, a set-top box device is disclosed that includes a processor, a memory accessible to the processor, a network interface, and a display interface. The memory includes a media content access module executable by the processor to apply an access rule to selected media content to limit access to the selected media content. The network interface receives the selected media content from a content source and an associated access rule from an access rule source. The display interface provides the selected media content to a display device based on the associated access rule.

In another particular embodiment, a method of providing media content access is disclosed that includes providing a list of available media content to a display device, receiving a selection related to the list of available media content, and sending data related to the selection to a content management system. The method further includes receiving media content from a content source based on the selection and an access rule related to the media content from an access rule source and applying the access rule to the selected media content, wherein the access rule defines a restriction to limit access to the media content.

In still another particular embodiment, a method of providing media content access is disclosed. The method includes receiving charge authorization data identifying a destination device, where the charge authorization data is related to a selection of media content from a list of available media content. The method further includes identifying an access rule associated with the selection based on the charge authorization data, where the associated access rule defines a restriction executable at the destination device to limit access to media content associated with the selection. The method also includes providing the access rule to the destination device.

In another particular embodiment, a method of providing media content access is disclosed that includes authorizing transmission of a first access rule to a destination device that restricts access to selected media content. The method further includes receiving a charge authorization related to the selected media content from the destination device and authorizing transmission of a second access rule to the destination device to restrict access to the selected media content in response to receiving the charge authorization.

In yet another particular embodiment, a computer-readable medium includes instructions to cause a processor to execute a method of providing media content access. The method includes providing a list of available media content to a display device, receiving a selection from the list of available media content, and sending data related to the selection to a content source and to an access rule source. The method further includes receiving media content from the content source based on the selection and an access rule related to the media content from the access rule source and applying the access rule to the selected media content, where the access rule defines a restriction for accessing the media content.

Figure 1:
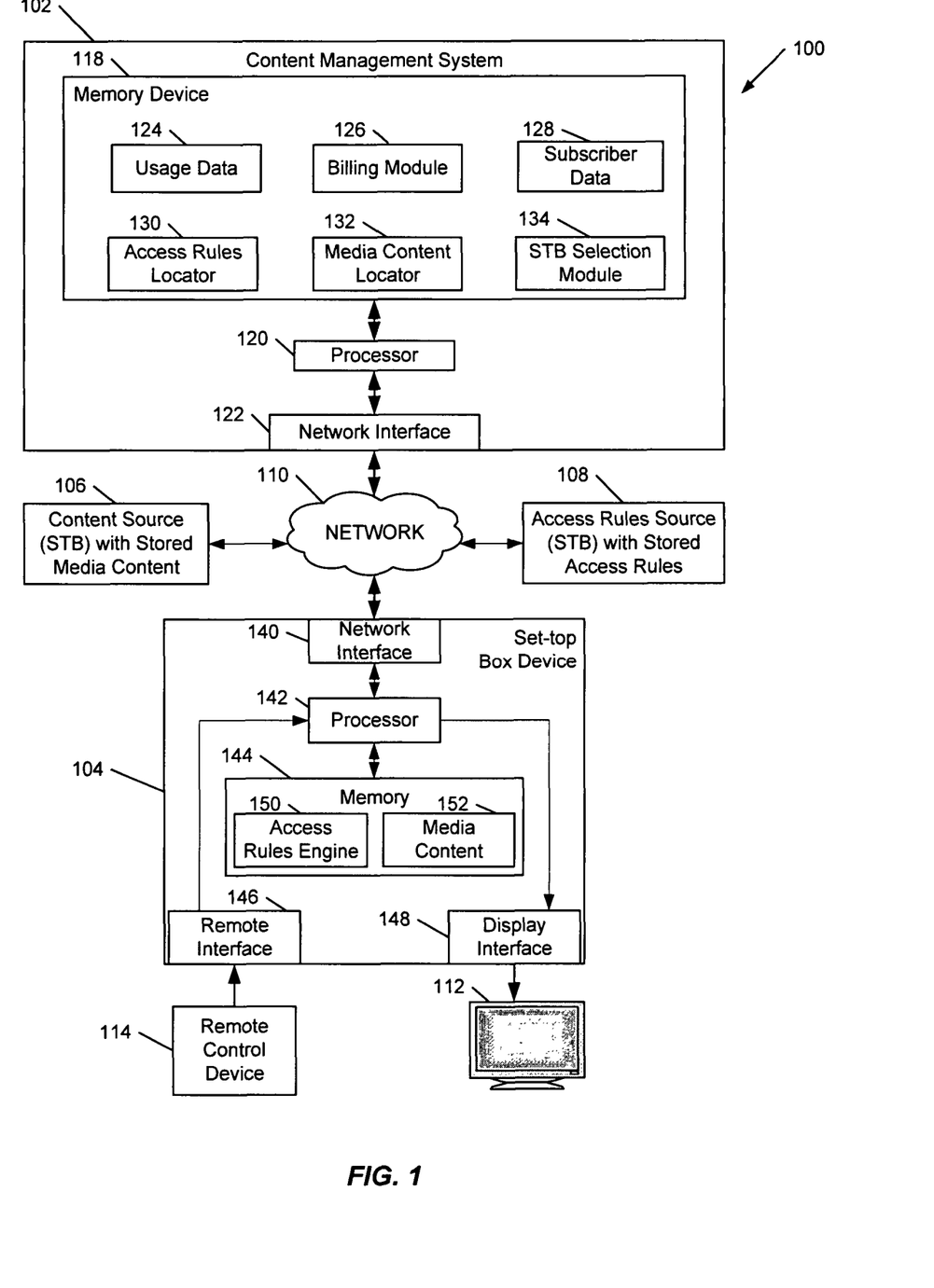
FIG. 1 is a block diagram of a particular illustrative embodiment of a system to provide media content.

FIG. 1 is a block diagram of a particular illustrative embodiment of a system 100 to provide media content. The system 100 includes a set-top box device 104 that communicates with a content management system 102, a content source 106, and an access rules source 108 via a network 110. The set-top box device 104 may provide media content, including an audio portion and a video portion, to a display device 112, such as a television. The set-top box device 104 may receive input selections from a remote control device 114.

In a particular illustrative embodiment, the content source 106 may be another set-top box device, a content server, or any combination thereof. The content source 106 includes stored media content and is adapted to provide stored media content to a destination device, such as the set-top box device 104, via the network 110. In a particular illustrative embodiment, the access rules source 108 may be another set-top box device, a rules server, or any combination thereof. The access rules source 108 includes stored access rules and is adapted to provide the stored access rules to a destination device, such as the set-top box device 104, via the network 110. In an illustrative embodiment, the network 110 can be an access network of an Internet Protocol Television (IPTV) system.

The content management system 102 includes a processor 120 and a memory 118 accessible to the processor 120. In a particular embodiment, the content management system 102 can include a network interface 122 that is responsive to the network 110. The memory 118 may include usage data 124, a billing module 126, subscriber data 128, an access rule locator 130, a media content locator 132, and a set-top box (STB) selection module 134. In a particular illustrative embodiment, the billing module 126 can be executed by the processor 120 to perform various billing functions, such as charging a subscriber account. The access rule locator 130 can be executed by the processor 120 to locate an access rule from an access rules source, such as the access rules source 108. The media content locator 132 can be executed by the processor 120 to locate selected media content. The STB selection module 134 can be executed by the processor 120 to select a set-top box device from a list of set-top box devices that include the located media content and to instruct the selected set-top box device to share its media content with another set-top box device.

In a particular illustrative embodiment, the set-top box device 104 includes a network interface 140 that is responsive to the network 110. The set-top box device 104 also includes a processor 142 that is coupled to the network interface 140, and a memory 144 that is accessible to the processor 142. The set-top box device 104 includes a remote interface 146 that is coupled to the processor 142 and that is responsive to input selections from the remote control device 114. The set-top box device 104 includes a display interface 148 that is coupled to the processor 142 and that provides audio and video to the display device 112.

In a particular illustrative embodiment, the content management system 102 may provide a list of available media content to the set-top box device 104. The content management system 102 may receive data from the set-top box device 104 indicating a selection from the list of available media content. The content management system 102 can utilize the media content locator 132 to locate media content related to the selection at the content source 106, which may be a content server, another set-top box device, or any combination thereof. The content management system 102 can utilize the access rules locator 130 to locate an access rule at the access rules source 106, which may be an access rules database, an access rules server, another set-top box device, or any combination thereof. The content management system 102 may instruct the identified content source 106 to provide the selected media content to the set-top box device 104 and may instruct identified access rules source 108 to provide an associated access rule to the set-top box device 104. The associated access rule may define one or more restrictions to limit access to the media content at a destination device, such as the set-top box 104. The set-top box device 104 may store the media content and the associated access rule in the media content storage 152 and may utilize the access rule engine 150 to apply the associated access rule to the media content to limit access to the media content at the display device 112.

In a particular embodiment, the content management system 102 may enforce the associated access rule by applying a selected access rule to the media content to produce a limited portion of the media content. The content management system 102 may provide the limited portion to the set-top box device 104.

In a particular illustrative embodiment, the associated access rule may define one or more restrictions to limit viewing of the media content to a time-limited portion, such as the first few minutes of the media content. In another particular illustrative embodiment, the access rule may define one or more restrictions to limit viewing of the media content at the destination device (e.g., the second set-top box device 104) to one or more randomly selected segments of the media content. In still another particular embodiment, the access rule may define one or more restrictions to limit viewing of the media content to an unlimited number of viewings within a particular time period (such as within twenty four hours of the download), to a limited number of viewings (e.g., five viewings), or any combination thereof. In another particular embodiment, the access rule may define one or more restrictions to alter the video data (e.g., to include a banner or a watermark, to scramble the video data after a time period has elapsed, to scramble the video data after displaying the first few minutes of the media content, or any combination thereof). In yet another particular embodiment, the media content may include a video program and associated data, such as commentary, reviews, text descriptions, or any combination thereof, and the associated access rule may define one or more restrictions to limit viewing of the media content to the commentary, the reviews, the text descriptions, or any combination thereof.

In an illustrative embodiment, the limited portion of the selected media content may be provided to the set-top box device 104 with a selectable indicator, which may be selected to trigger authorization of a charge to a subscriber account associated with the set-top box device 104. The content management system 102 may receive data from the set-top box device 104 including a charge authorization and may record a charge related to the media content to the usage data 124 or to the subscriber data 128. With the authorization received, the content management system 102 may provide the selected media content in its entirety, along with a second access rule enabling the subscriber to have access to the entire selected media content. For example, the second access rule may permit the subscriber to have unlimited access to the selected media content within a pre-defined period of time. Alternatively, the second access rule may permit the subscriber to access the media content a predetermined number of times, after which the media content may become inaccessible.

In a particular illustrative embodiment, a user may access a menu or a selectable indicator at the destination device, such as the set-top box device 104, to authorize a charge associated with the media content. Alternatively, the user may call a telephone number associated with the content provider to authorize a charge to an account associated with the set-top box device 104. In another embodiment, the user may visit a web site associated with the content provider to authorize a charge to an account associated with the set-top box device 104.

In a particular embodiment, the content source 106 may be a set-top box device that is adapted to share stored media content with the set-top box device 104 via the network 110. For instance, the content source 106 may be a set-top box device that includes a peer-to-peer module (such as the peer-to-peer module 222 shown in FIG. 2) to facilitate sharing of the media content.

In an embodiment, the content management system 102 may store data related to sharing of media content in the usage data 124 and may access the billing module 126 to charge a subscriber account associated with a destination device (such as the set-top box 104) for media content downloads. Additionally, the content management system 102 may access the billing module 126 to credit a subscriber account associated with the content source 106, if the content source is another set-top box device.

In a particular illustrative embodiment, where a media content selection is stored at two or more set-top box devices coupled to the network 110, the processor 120 of the content management system 102 may execute the set-top box device (STB) selection module 134 to identify set-top box devices that have the media content and to select a set-top box device to serve as the content source 106 with respect to the requesting set-top box device. For example, the content management system 102 can select the content source 106 to share its media content with other set-top box devices based on one or more factors, such as available bandwidth, network capacity, load balancing, the particular content source's logical or physical proximity to the requesting set-top box device, other factors, or any combination thereof.

In an illustrative embodiment, the content management system 102 may utilize geographic information and network connectivity information to selectively instruct the content source 106 to share media content with the set-top box device 104. The content management system 102 may maintain a list of media content stored at the content management system 102 and stored by set-top box devices that communicate via the network 108. The content management system 102 may provide the list of available content to the set-top box device 104. The content management system 102 may receive data related to a selection from the list of available content from the set-top box device 104. The content management system 102 may identify a list of set-top box devices at which the media content related to the data is stored. The content management system 102 may select a set-top box device from the list, such as the content source 106, and may send a request to the selected set-top box device to send the media content selection to the set-top box device 104 via the network 110.

In another particular embodiment, if the content management system 102 determines that the network distance (e.g., a number of network hops) between the requesting set-top box device and a set-top box device that stores the selected media content exceeds a predetermined number, the content management system 102 may provide the media content directly to the set-top box device 104. If the network distance is less than the predetermined number, the content management system 102 may send a request to the set-top box device that has the media content to serve as the content source 106 and to share selected media content with the requesting set-top box device. In a particular illustrative, non-limiting embodiment, the content management system 102 may instruct set-top box devices associated with the network 110 to provide requested media content in order to improve download speeds, reduce network load, enhance usability, or any combination thereof.

In general, while the content management system 102, the content source 106, and the access rules source 108 are shown as separate entities, in a particular embodiment, the content source 106 and the access rules source 108 may be the same device. In another particular embodiment, another set-top box device may serve as both the content source 106 and the access rules source 108, providing both the selected media content and the associated access rule to the requesting set-top box device. In another particular illustrative embodiment, the content management system 102 may include the content source 106 and the access rules source 108. In still another particular embodiment, the content management system 102 may include the access rules source 108.

Figure 2:
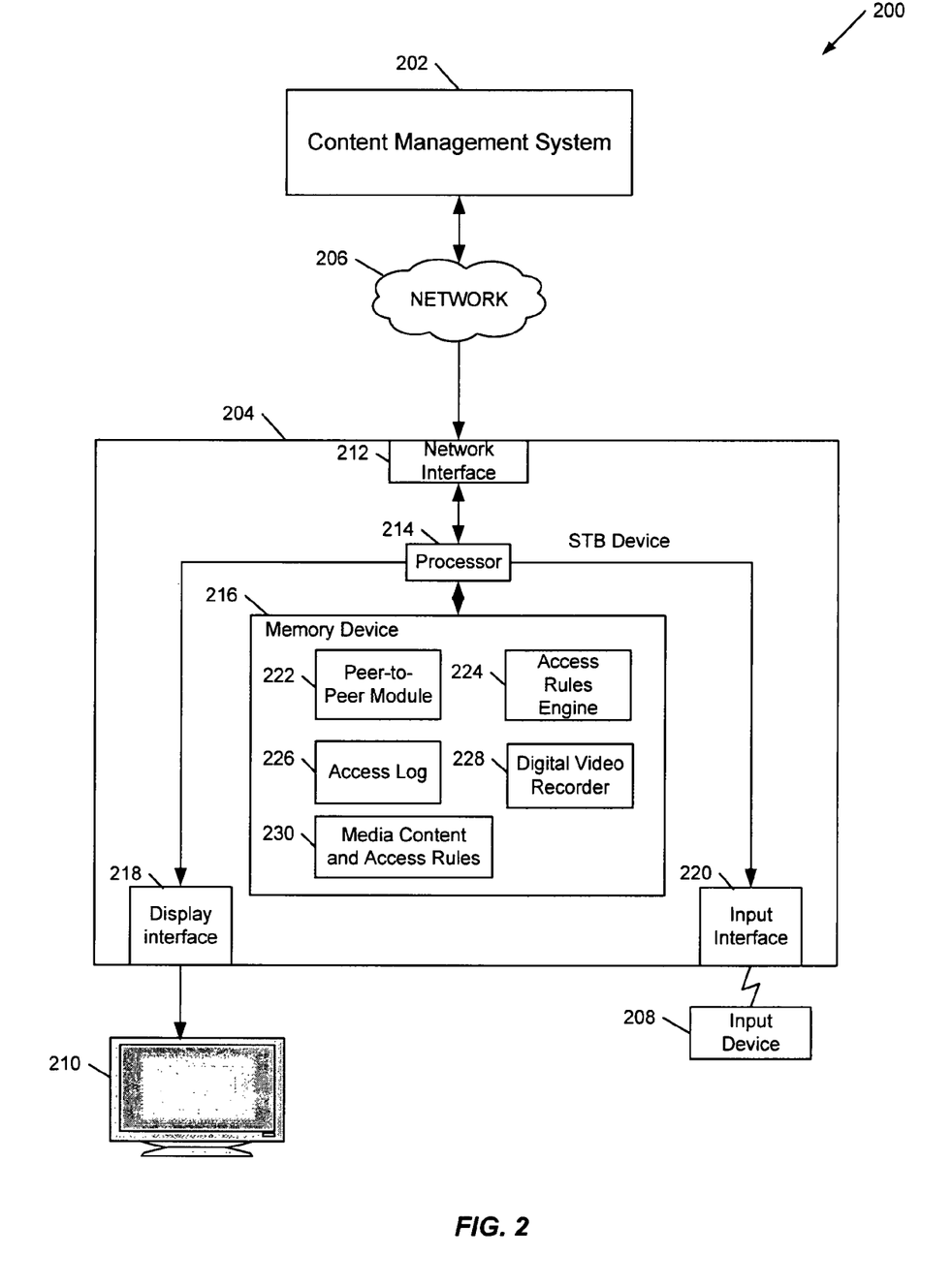
FIG. 2 is a block diagram of a second particular illustrative embodiment of a system to provide media content.

FIG. 2 is a block diagram of a second particular illustrative embodiment of a system 200 to provide media content. The system 200 includes a content management system 202 and a set-top box device 204, which may communicate via a network 206. The set-top box device 204 may include a network interface 212 that is responsive to the network 206, a processor 214 coupled to the network interface 212, and a memory device 216 accessible to the processor 214. The memory device 216 may include a peer-to-peer module 222, an access rule engine 224, an access log 226, a digital video recorder (DVR) module 228, and a media content and access rule storage 230. The set-top box device 204 may receive input from an input device 208, such as a remote control device, a personal digital assistant (PDA) device, another input device, or any combination thereof, via an input interface 220. Additionally, the set-top box device 204 may be coupled to a display device 210 via a display interface 218.

In a particular illustrative embodiment, the processor 214 may execute instructions associated with the DVR module 228 to record media content and associated access rules to the media content and access rule storage 230. For example, the set-top box device 204 may provide a DVR menu associated with the DVR module 228 to the display device 210 and may receive a selection related to the DVR menu from the input device 208 via the input interface 220. The selection may be related to list of available media content, such as a particular television program. The set-top box device 204 may send data related to the selection to the content management system 202, which may maintain a list of available media content.

In a particular embodiment, the set-top box device 204 may receive a list of available content from the content management system 202. The set-top box device 204 may send the list of available content to the display device 210. The set-top box device 204 may receive a selection from the list of available content from the input device 208 via the input interface 220. The set-top box device 204 may send data related to the selection to the content management system 202. In a particular illustrative embodiment, the content management system 202 may provide the media content and the associated access rule. In another particular illustrative embodiment, the content management system 202 may identify a content source and an access rules source and instruct the identified sources to transmit the selected media content and the associated access rule to the set-top box device 204.

The set-top box device 204 may receive the media content and the associated access rule via the network 206 and may store the media content and the associated access rule in the media content storage 230. In a particular embodiment, the processor 214 may execute the digital video recorder (DVR) module 228 to store the media content and the associated access rule in the media content and access rule storage 230. The processor 214 may execute the access rule engine 224 to apply the associated access rule to the media content to identify a portion of the media content and to provide the identified portion to the display device 210 via the display interface 218. In a particular illustrative embodiment, the portion may include a time-limited segment from the media content, one or more randomly selected segments from the media content, metadata associated with the media content, or a combination thereof. In a particular embodiment, the media content may include metadata that includes commentary data, a media content trailer, and ratings data associated with the media content.

Additionally, the set-top box device 204 may receive a request from the content management system 202 to share stored media content with another set-top box device via the network 206. In response to receiving the request, the set-top box device 204 may utilize the processor 214 to execute instructions associated with the peer-to-peer module 222. The set-top box device 204 may retrieve media content related to the request from the media content and access rules storage 230. The set-top box device 204 may send the retrieved media content to a destination device via the network 206.

In a particular embodiment, the processor 214 may execute instructions associated with the access rules engine 224 to apply the associated access rule to identify a portion of the media content. The processor 214 may execute instructions associated with the peer-to-peer module 222 to send the portion of the media content to a destination device, such as another set-top box device, via the network 206. In a second particular embodiment, the processor 214 may execute the peer-to peer module 222 to notify the content management system 202 and to send a copy of the media content to a destination device via the network 206, where the content management system 202 provides the access rule or instructs an access rules source to provide the access rule to the destination device. In a third particular embodiment, a user may access a menu via the set-top box device 204 to customize access rules related to particular media content, and the set-top box device 204 can provide the media content and the associated custom access rule to the destination device. The associated custom access rule may define customized access restrictions.

In a particular illustrative embodiment, the peer-to-peer module 222 may include instructions executable by the processor 214 to record access data to the access log 226. For example, access data may include a record of media content sent from the set-top box device 204 to the other set-top box device. In an embodiment, the peer-to-peer module 222 may provide information from the access log 226 to a billing module of the content management system 202 to trigger billing of a subscriber account associated with a destination device for the shared media content. In a particular illustrative embodiment, the content management system 202 may be adapted to credit a subscriber account associated with the set-top box 204 for sharing media content. In a particular illustrative embodiment, the content management system 202 may provide an incentive such as a "kickback," a telecommunications credit, other reward, or any combination thereof to the subscriber account associated with the set-top box device 204. For example, in a particular embodiment, when the subscriber's set-top box device is requested to share stored media content, the content source 204 may credit the subscriber's account with a telecommunications credit, such as an allotment of telecommunications minutes, or other credits.

In a particular illustrative embodiment, access rules may be applied to media content to provide a portion of the media content, such as a first few minutes of the media content, one or more random selections from the media content, or another time-limited portion of the media content. The portion of the media content may allow a user to view a sample or to view information about the media content in order to pique the viewer's interest. In another particular illustrative embodiment, the selected media content may be provided in its entirety but the access rules may be applied to impose a visible indicator within the media content, such as a visual distortion of the media content, indicating that the data provided is a sample. In a particular illustrative example, the access rule may be applied to insert a watermark, a banner, or other disruption of the media content (e.g., the term "SAMPLE" may be superimposed over video data of the media content at the display device 210). In another particular illustrative embodiment, the access rules may be applied to scramble or distort audio data associated with the media content. A user may authorize a charge transaction to a subscriber account associated with the destination device, and the content management system 202 may provide a second access rule to the destination device. The second access rule may be applied to the media content to allow the media content to be displayed without disruption at the destination device.

In a particular illustrative embodiment, a user may view a portion of selected media content at the display device 210 that is associated with the set-top box device 204 based on the associated access rule. The user may access a menu or may select an indicator shown with the media content to authorize payment for the selected media content. The set-top box 204 may communicate data related to the payment authorization to the content management system 202, causing the content management system 202 to provide a second access rule to the set-top box device 204 to "unlock" the media content such that the set-top box device 204 provides the media content to the display device 210 without disrupting the video or audio display of the media content.

In a particular illustrative embodiment, the user may authorize a credit card charge or a charge to a subscriber account associated with the set-top box device. In a second illustrative embodiment, the subscriber may pay for the media content using telecommunication credits associated with the subscriber's account. Alternatively, the subscriber may pay for the media content with other non-cash credits, such as mile points, rewards credits, pre-paid media minutes, or any combination thereof. In another particular illustrative embodiment, a user may pay for media content through an in-kind exchange, such as by authorizing sharing of media content with other subscribers. In this instance, a user may receive a download credit for each shared-selection of media content, for every three shared-selections of media content, or for some other number of shared-selections.

In a particular illustrative embodiment, the content management system 202 may maintain a list of media content stored at each set-top box device that communicates via the network. For example, each set-top box device may communicate a list of stored media content to the content management system 202. The content management system 202 may periodically query the set-top box devices, including the set-top box device 204, to update the list of stored media content.

Figure 3:
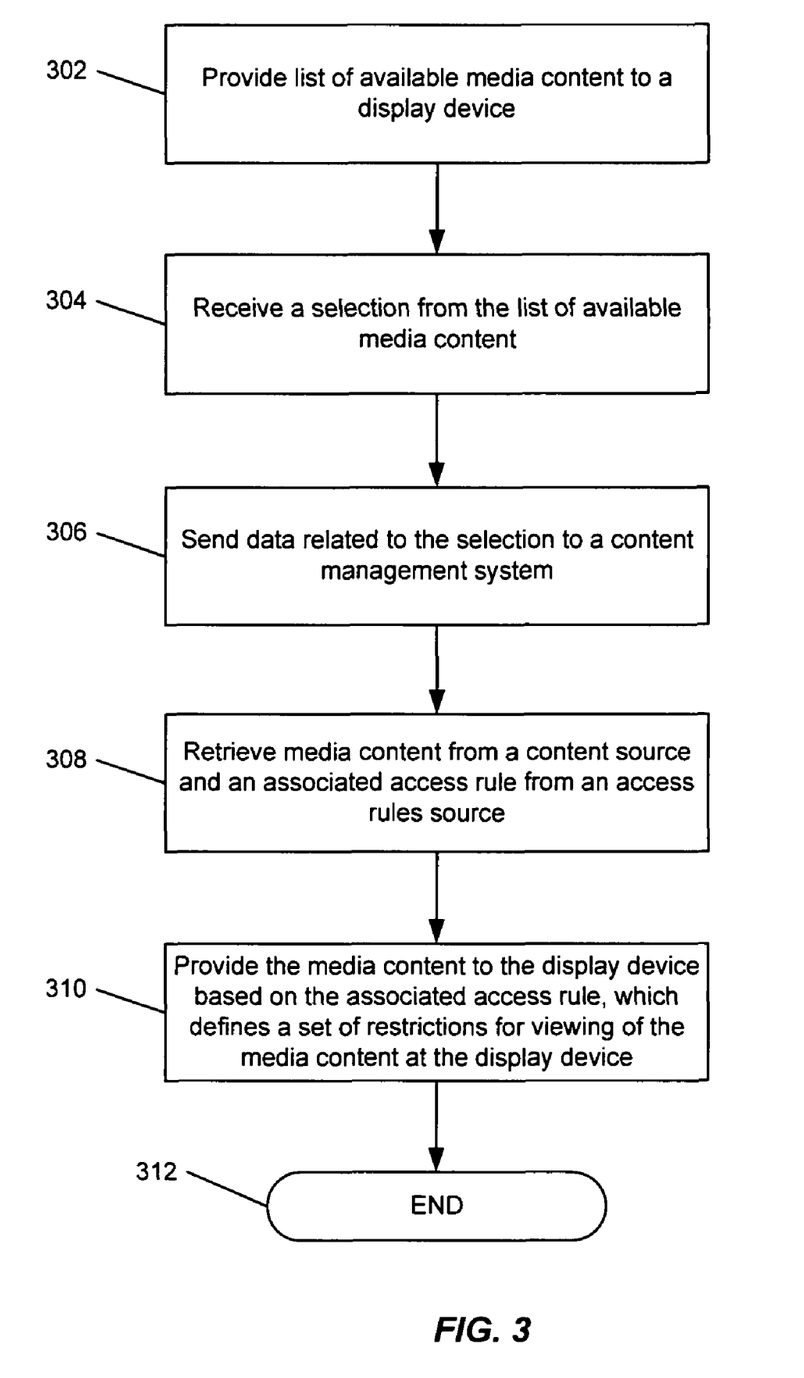
FIG. 3 is a flow diagram of a first particular illustrative embodiment of a method of providing media content.

FIG. 3 is a flow diagram of a first particular embodiment of a method of providing media content. A set-top box device may provide list of available media content to a display device, at 302. Moving to 304, the set-top box device may receive a selection from the list of available media content. Proceeding to 306, the set-top box device may send data related to the selection to a content management system. Continuing to 308, the set-to box device may retrieve media content and an associated access rule based on the input selection. In a particular illustrative embodiment, the media content may be retrieved from a content source and the associated access rule may be retrieved from an access rules source. In another particular illustrative embodiment, the media content and the associated access rule may be retrieved from a content storage at a memory of the set-top box device, from another set-top box device, from a content management system, from an access rules source, or from any combination thereof. Advancing to 310, the set-top box device may provide the media content to the display device based on the associated access rule, which defines one or more restrictions for viewing of the media content at the display device. The method terminates at 312.

Figure 4:
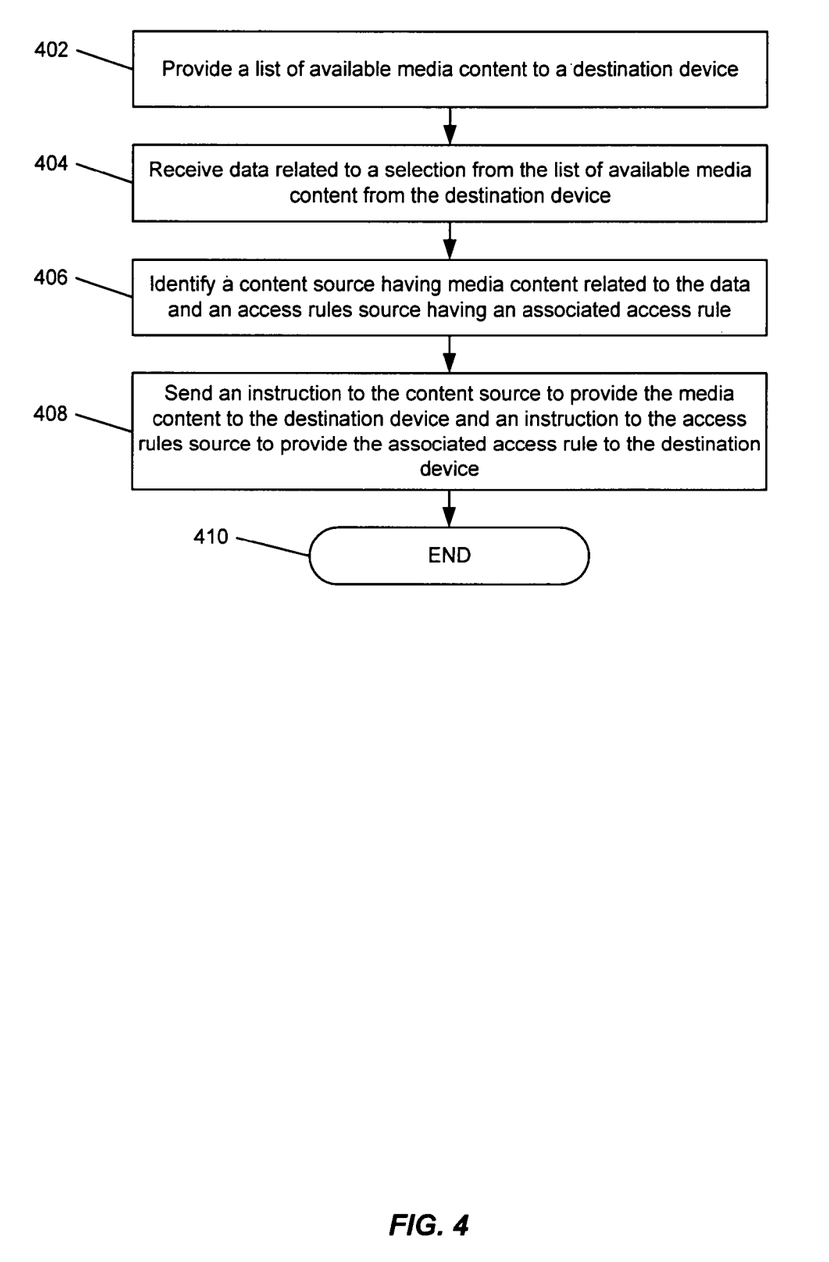
FIG. 4 is a flow diagram of a second particular illustrative embodiment of a method of providing media content.

FIG. 4 is a flow diagram of a second particular illustrative embodiment of a method of providing media content. At 402, a content management system may provide a list of available media content to a destination device. Moving to 404, the content management system may receive data related to a selection from the list of available media content, where the data includes an identifier related to the selected media content and subscriber data associated with the destination device. Advancing to 406, the content management system may identify a content source having media content related to the data and an access rules source having an associated access rule. At 408, the content management system sends an instruction to the content source to provide the media content to the destination device and an instruction to the access rules source to provide the associated access rule to the destination device. In an illustrative embodiment, the associated access rule may define one or more restrictions to limit access to the media content at the destination device. The method terminates at 410.

In a particular illustrative embodiment, the subscriber data may include an access level (e.g., a subscriber access level) associated with the subscriber's account, indicating a level of access to which the subscriber is entitled. For example, a particular subscriber may be a premium subscriber having access to a number of media content downloads each month.

The accessibility level may be used to select an access rule, which may be enforced by the content source or by an access rule engine of the destination device to restrict viewing of the media content at the destination device.

Figure 5:
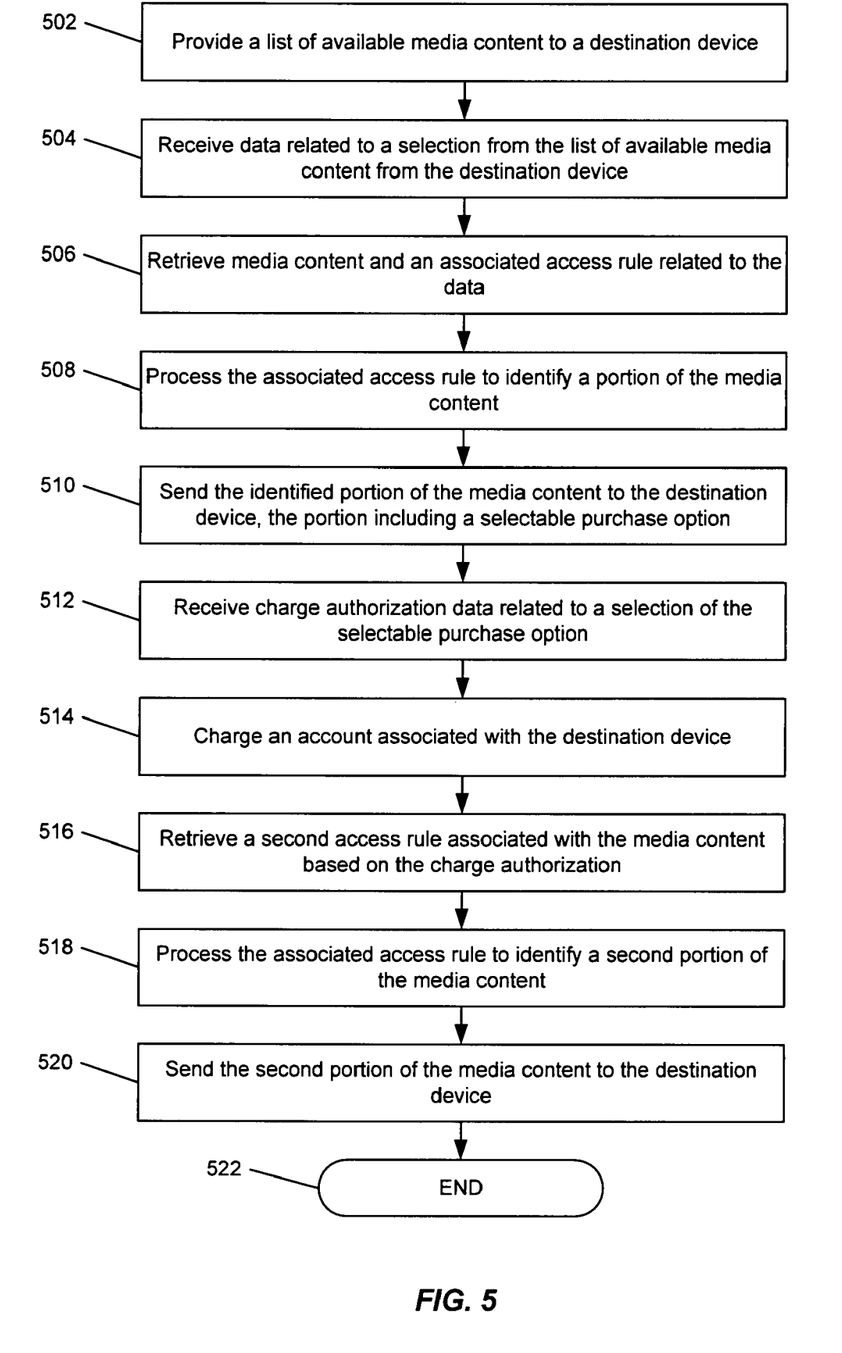
FIG. 5 is a flow diagram of a third particular illustrative embodiment of a method of providing media content.

FIG. 5 is a flow diagram of a third particular illustrative embodiment of a method of providing media content. At 502, a content management system provides a list of available media content to a destination device. Advancing to 504, the content management system receives data related to a selection from the list of available media content from the destination device. Proceeding to 506, the content management system retrieves the media content and an associated access rule. In a particular illustrative embodiment, the content management system may identify a content source that has the media content and an access rules source that has the associated access rule. The content management system may then retrieve the media content from the content source and the associated access rule from the access rules source.

At 508, the content management processes the associated access rule to identify a portion of the media content. Advancing to 510, the content management system sends the identified portion of the media content to the destination device. In a particular embodiment, the identified portion may include a selectable purchase option. Moving to 512, the content management system receives charge authorization data related to a selection of the selectable purchase option from the destination device. At 514, the content management system charges an account associated with the destination device. Proceeding to 516, the content management system retrieves a second access rule associated with the media content based on the charge authorization.

In a particular embodiment, the charge authorization may qualify a subscriber to view a particular media content selection one time, multiple times within a pre-defined time limit, or an unlimited number of times. In an illustrative embodiment, the charge authorization may qualify the subscriber at a destination device to view the selected media content five times. If the selected media content is shared with another device, a different access rule may apply to the other device, depending on the particular charge authorized at the other device.

The method advances to 518 and the content management system processes the associated access rule to identify a second portion of the media content. At 520, the content management system sends the second portion of the media content to the destination device. In an illustrative example, the second portion may be the balance of the media content, which together with the first portion forms the entire selected media content. The method terminates at 522.

In general, the content management system may send a media content selection in its entirety and an associated rule to the set-top box device. Alternatively, the content management system may instruct a content source to send the media content selection and an access rules source to send the associated rule to the set-top box device. The set-top box device may include an access rule engine that is executable by a processor of the set-top box device to enforce (apply) the access rule to limit viewing of the media content at an associated display device. In this example, blocks 508 and 518 in FIG. 5 may be omitted, and the content source may send the media content and the access rule to the destination device at block 510. Additionally, in this example, the content management system may send a second access rule at block 520. The set-top box device may utilize the access rule engine apply the associated access rule to limit viewing of the media content. After payment is authorized, the set-top box device may utilize the access rule engine to apply the second access rule to provide the media content at the display device. The second access rule may restrict access to a limited number of showings or may limit access to a particular time period, for example.

Figure 6:
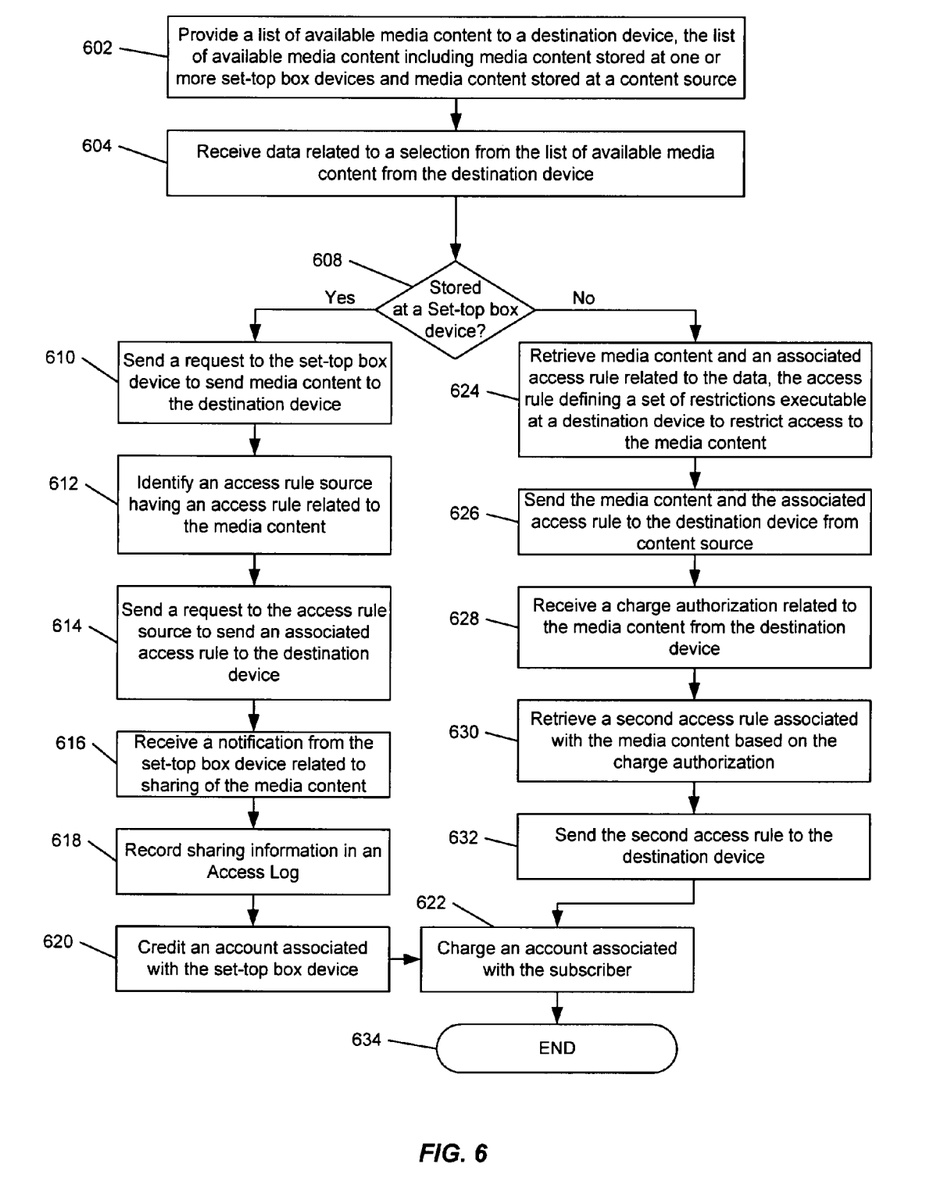
FIG. 6 is a flow diagram of a fourth particular illustrative embodiment of a method of providing media content.

FIG. 6 is a flow diagram of a fourth particular illustrative embodiment of a method of providing media content. At 602, the content management system provides a list of available media content to a destination device, where the list of available media content includes media content stored at one or more set-top box devices and media content stored at the content management system. Moving to 604, the content management system receives data related to a selection from the list of available media content from the destination device. Advancing to 608, the content management system determines whether the selected media content is stored at a set-top box communicating with the network. If the selected media is stored at a set-top box communicating with the network, the method advances to 610, and the content management system sends a request to the set-top box device to send a copy of the media content to the destination device.

Advancing to 612, in a particular embodiment, the content management system retrieves an access rule related to the media content. Proceeding to 614, the content management system sends the access rule to the destination device. The access rule defines one or more restrictions for viewing the media content at the destination device. At 616, the content management system receives a notification from the set-top box device related to sending the media content. Alternatively, the content management system may receive a notification from the destination device related to receiving the media content. Moving to 618, the content management system records sharing information in an access log. At 620, the content management system credits an account associated with the set-top box device that sent the media content. Proceeding to 622, the content management system charges an account associated with the destination device.

Returning to 608, if the media content is not available from a set-top box device, the method advances to 624, and the content management system retrieves the media content and an associated access rule. The access rule defines one or more restrictions, executable at the destination device, to restrict access to the media content. Moving to 626, the content management system sends the media content and the associated access rule to the destination device. Advancing to 628, the content management system receives a charge authorization related to the media content from the destination device. Proceeding to 630, the content management system retrieves a second access rule associated with the media content based on the charge authorization. In an illustrative example, the second access rule may allow the subscriber to access the selected media content for a pre-defined number of instances (e.g., two times). At 632, the content management system sends the second access rule to the destination device. Advancing to 622, the content management system charges an account associated with the subscriber. The method terminates at 634.

In a particular illustrative embodiment, portions of the method shown in FIG. 6 may be performed simultaneously, in alternate sequences, or any combination thereof. In another particular illustrative embodiment, portions of the method having one or more blocks removed may be performed simultaneously, in alternate sequences, or any combination thereof.

Figure 7:
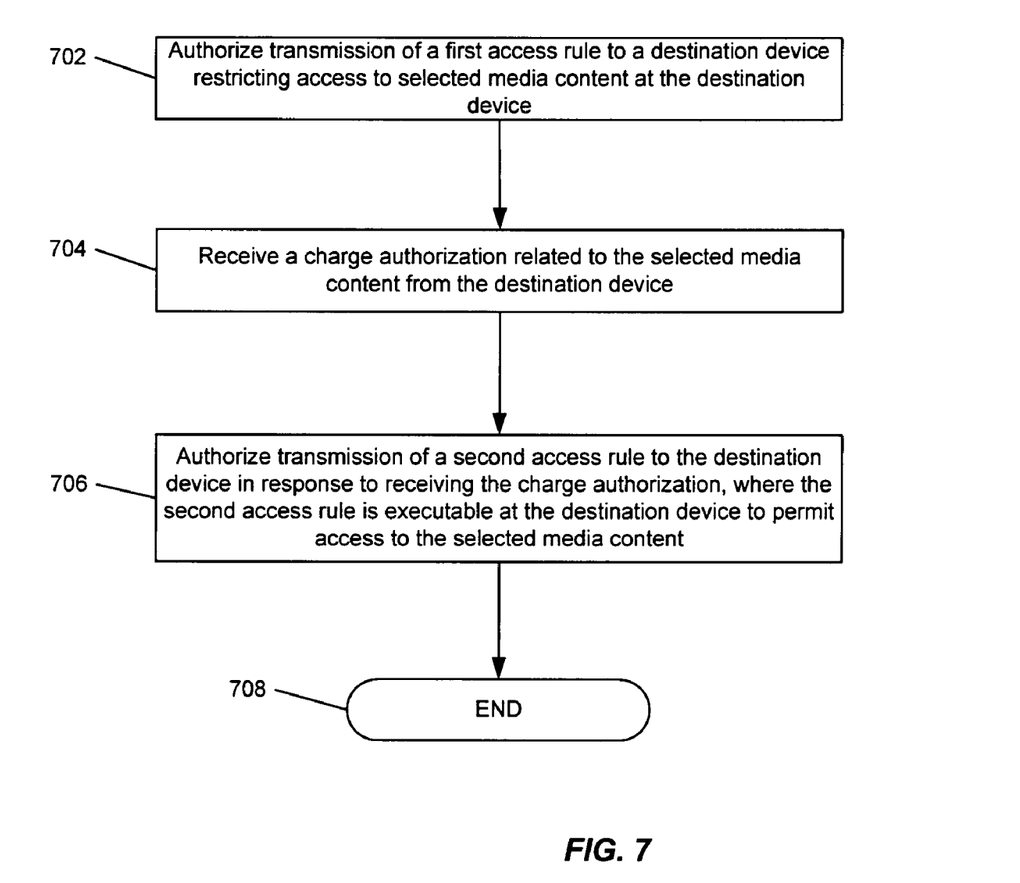
FIG. 7 is a flow diagram of a fifth particular illustrative embodiment of a method of providing media content.

FIG. 7 is a flow diagram of a fifth particular illustrative embodiment of a method of providing media content. At 702, the content management system authorizes transmission of a first access rule to a destination device, restricting access to selected media content at the destination device. Advancing to 704, the content management system receives a charge authorization related to the selected media content from the destination device. Proceeding to 706, the content management system authorizes transmission of a second access rule to the destination device in response to receiving the charge authorization, where the second access rule is executable at the destination device to permit access to the selected media content. The method terminates at 708.

In conjunction with the configuration of structure described herein, the system and method disclosed provide media content to one or more destination devices via a network. In a particular illustrative embodiment, a content management system can provide a list of available media content to a set-top box device. In a particular embodiment, the list of available media content may include media content stored at the content management system and at one or more set-top box devices. The content management system can receive data related to a selection from the list of available content from a destination device. In a particular embodiment, the content management system can retrieve the selected media content and an associated access rule and can provide the media content to the destination device based on the access rule. In another particular embodiment, the content management system can identify a content source and an access rules source and instruct the identified content source and address rules source to transmit the selected media content and the associated access rule to the destination device. In a particular embodiment, the access rule can define one or more restrictions related to viewing of the media content at the destination device. In another particular embodiment, the content management system can apply the access rule to identify a portion of the media content related to the data and can provide the identified portion to the destination device. In still another particular embodiment, the content management system can determine a storage location of media content related to the data. If the storage location is a set-top box device, the content management system can request the set-top box device to send the media content to the destination device. In a particular embodiment, the content management system can send an access rule to the set-top box device, where the access rule defines one or more restrictions to limit viewing of the media content at the destination device.

Figure 8:
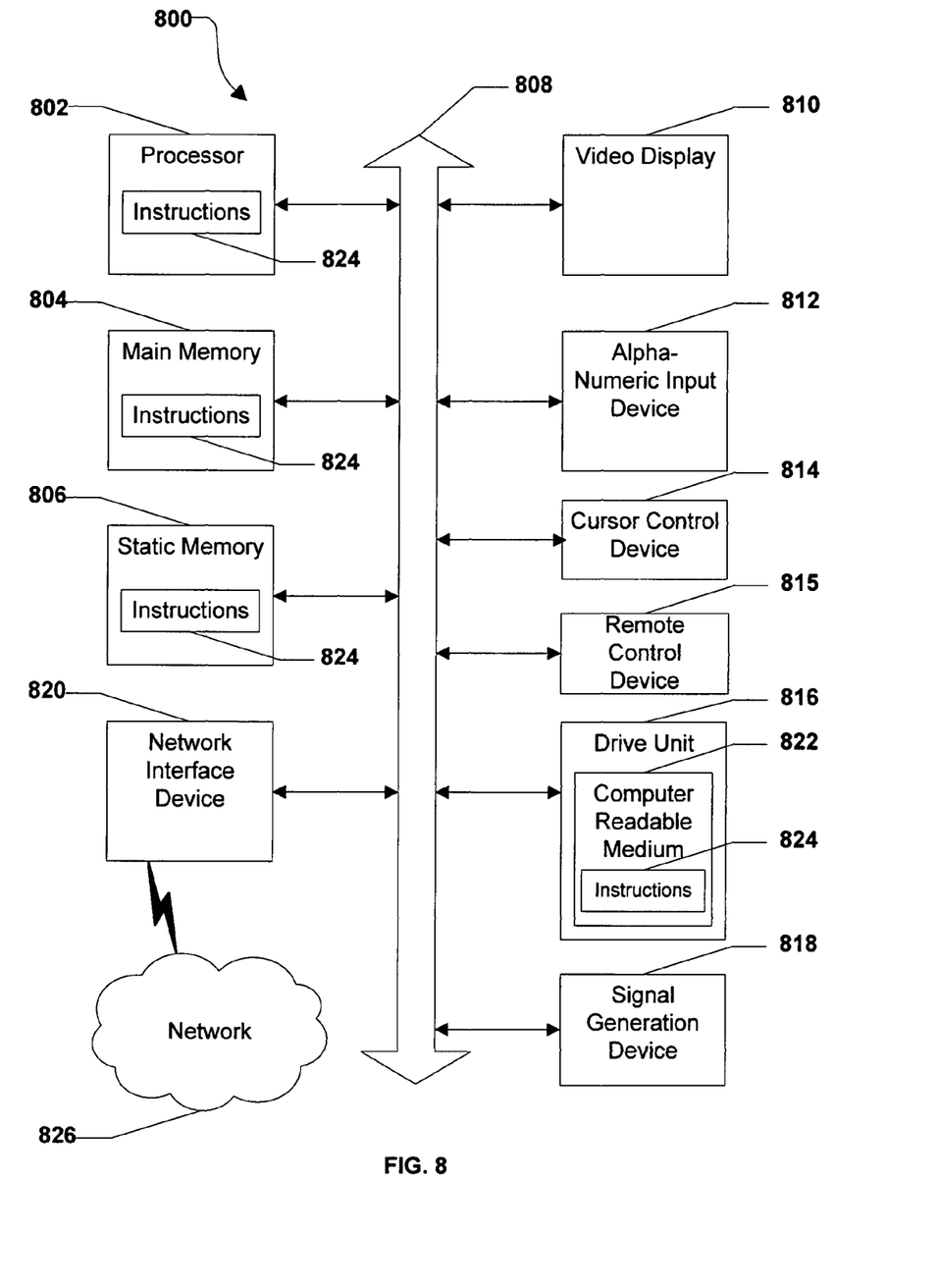
FIG. 8 is a block diagram of a particular illustrative embodiment of a general computing system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices, such as a content management system or set-top box devices, as illustrated in FIGS. 1-2.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, media or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a media display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, a cursor control device 814, such as a mouse, and a remote control device 815. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, media or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing media content access, the method comprising:
   providing a list of available media content from a set-top box device to a display device;
   receiving a selection related to the list of available media content;
   sending data related to the selection to a content management system;
   receiving selected media content from a content source based on the selection;
   receiving an access rule related to the selected media content from an access rule source;
   identifying a restriction of the access rule that limits access to the selected media content to a first portion of the selected media content that is less than an entirety of the selected media content;
   altering the selected media content at the set-top box device based on the access rule, wherein the altered selected media content includes the first portion of the selected media content without disruption and wherein the altered selected media content does not include a second portion of the selected media content without disruption;
   sending the first portion of the selected media content from the set-top box device to the display device; and
   restricting viewing of the first portion of the selected media content to a pre-determined number of viewings based on the access rule.

2. The method of claim 1, wherein the first portion of the selected media content is selected from text data, commentary data, review data, and trailer data.

3. The method of claim 1, further comprising:
   receiving a charge authorization including an authorization to debit an account of a subscriber;
   transmitting data related to the charge authorization to the access rule source;
   receiving a second access rule from the access rule source;
   identifying a second restriction of the second access rule that enables access to the second portion of the selected media content; and
   altering the selected media content at the set-top box device based on the second access rule, wherein the altered selected media content includes the first portion of the selected media content and the second portion of the selected media content without disruption.

4. The method of claim 1, wherein altering the selected media content includes inserting a visible indicator into the selected media content at the display device, wherein the visible indicator interferes with viewing of the second portion of the selected media content.

5. A set-top box device, comprising:
  a network interface to receive selected media content from a content source and to receive an associated access rule from an access rule source;
  a processor and a memory accessible to the processor, wherein the memory comprises a media content access module executable by the processor to:
    identify a restriction of the associated access rule that limits access to the selected media content to a first portion of the selected media content that is less than an entirety of the selected media content; and
    alter the selected media content based on the access rule, wherein the altered selected media content includes the first portion of the selected media content without disruption and wherein the altered selected media content does not include a second portion of the selected media content without disruption; and
  a display interface to provide the altered selected media content to a display device based on the associated access rule, wherein the associated access rule limits a length of the first portion of the selected media content to a particular amount of time.

6. The set-top box device of claim 5, wherein the access rule source is a second set-top box device.

7. The set-top box device of claim 5, wherein the content source is a second set-top box device.

8. A non-transitory processor-readable medium having instructions to cause a processor to execute a method of providing media content access, the method comprising:
  providing a list of available media content to a display device;
  receiving a selection from the list of available media content;
  sending data related to the selection to a content source and to an access rule source;
  receiving selected media content from the content source based on the selection;
  receiving an access rule related to the selected media content from the access rule source;
  identifying a restriction of the access rule that limits access to the selected media content to a first portion of the selected media content that is less than an entirety of the selected media content;
  altering the selected media content based on the access rule, wherein the altered selected media content includes the first portion of the selected media content without disruption and wherein the altered selected media content does not include a second portion of the selected media content without disruption; and
  sending the first portion of the selected media content to the display device, wherein the access rule permits viewing of the first portion of the selected media content only during a pre-defined period of time.

9. The non-transitory processor-readable medium of claim 8, wherein the first portion has a duration specified by the access rule, and wherein altering the selected media content comprises selecting a segment of the selected media content having the duration to be the first portion of the selected media content.

10. The non-transitory processor-readable medium of claim 8, wherein the method further comprises selecting a first portion of the selected media content.

11. The method of claim 1, wherein the content source is a second set-top box device.

12. The method of claim 11, wherein the second set-top box device is selected based on network connectivity information from among a plurality of set-top box devices that have the selected media content.

13. The method of claim 11, wherein the second set-top box device is selected based on physical proximity of the second set-top box device to the set-top box device.

14. The method of claim 1, further comprising:
  altering the second portion of the selected media content to inhibit viewing of the second portion of the selected media content; and
  sending the altered second portion of the selected media content to the display device.

15. The method of claim 14, further comprising:
  receiving a second access rule related to the selected media content at the set-top box device; and
  sending the entirety of the selected media content to the display device without alteration in response to the second access rule.

16. The method of claim 1, wherein the selected media content includes a video program and metadata comprising commentary data, a media content trailer, and ratings data associated with the video program, and wherein the first portion of the selected media content includes the metadata and does not include the video program, and wherein the second portion of the selected media content includes the video program.

17. The method of claim 1, wherein the selected media content includes video data and associated audio data, and wherein the first portion of the selected media content includes the video data and the second portion of the selected media content includes the audio data.

18. The set-box device of claim 5, wherein the processor adds a watermark to the second portion of the selected media content before the display interface provides the second portion of the selected media content to the display device.

19. The set-box device of claim 5, wherein the processor adds a banner to the second portion of the selected media content before the display interface provides the second portion of the selected media content to the display device.

20. The set-box device of claim 5, wherein the processor adds text indicating that the second portion of the selected media content is a sample before the display interface provides the second portion of the selected media content to the display device.

21. The non-transitory processor-readable medium of claim 8, wherein the method further comprises scrambling video of the second portion of the selected media content and sending the scrambled second portion of the selected media content to the display device.

22. The non-transitory processor-readable medium of claim 8, wherein the first portion of the selected media content includes an audio portion of the selected media content, and wherein the second portion of the selected media content includes a video portion of the selected media content.

23. The non-transitory processor-readable medium of claim 8, wherein the method further comprises sending a selectable indicator to the display device with the first portion of the selected media content, wherein the selectable indicator enables purchasing of access to the second portion of the selected media content without disruption.

24. The non-transitory processor-readable medium of claim 8, wherein the access rule is selected based on a subscriber access level associated with a subscriber account.

* * * * *